United States Patent
Millet et al.

[11] Patent Number: 6,129,780
[45] Date of Patent: Oct. 10, 2000

[54] PROCESS AND DEVICE FOR PURIFICATION OF GAS BY ADSORPTION WITH FIXED HORIZONTAL BEDS

[75] Inventors: Cyrille Millet; Philippe Bourgeois; Georges Kraus, all of Paris; Jean-Pierre Gabillard, Auffargis, all of France

[73] Assignee: L'Air Liquide, Paris, France

[21] Appl. No.: 09/258,391

[22] Filed: Feb. 26, 1999

[30] Foreign Application Priority Data

Feb. 26, 1998 [FR] France .................................. 98 02328

[51] Int. Cl.$^7$ .................................................. B01D 53/04
[52] U.S. Cl. ................... 95/117; 95/139; 95/143; 96/132; 96/137
[58] Field of Search .......................... 95/117–119, 139, 95/143; 96/130–132, 137, 149

[56] References Cited

U.S. PATENT DOCUMENTS

| | | | |
|---|---|---|---|
| 2,101,961 | 12/1937 | Slidell . | |
| 2,586,670 | 2/1952 | Lambertsen | 96/149 |
| 3,471,025 | 10/1969 | Dobson | 210/282 |
| 5,202,096 | 4/1993 | Jain | 95/139 X |
| 5,593,475 | 1/1997 | Minh | 96/132 X |
| 5,626,763 | 5/1997 | Mathews | 210/660 |
| 5,716,427 | 2/1998 | Andreani et al. | 96/130 X |
| 5,769,928 | 6/1998 | Leavitt | 95/139 X |
| 5,989,314 | 11/1999 | Schaub et al. | 95/96 |

FOREIGN PATENT DOCUMENTS

| | | |
|---|---|---|
| 0 718 024 | 6/1996 | European Pat. Off. . |
| 0 765 681 | 4/1997 | European Pat. Off. . |
| 60-137431 | 7/1985 | Japan ............................ 96/131 |

*Primary Examiner*—Robert H. Spitzer
*Attorney, Agent, or Firm*—Young & Thompson

[57] ABSTRACT

Process and apparatus for the purification of a gaseous flow containing at least one impurity which can be carbon dioxide, water vapor and/or hydrocarbon. The impurity is adsorbed on a bed of adsorbent containing at least one adsorbent material, it being possible to use stacked adsorbent beds. Atop the uppermost bed is a layer of particulate ballast having a density greater than that of the adsorbent. The bed of ballast exerts a mechanical pressure on the subjacent adsorbent and prevents fluidization of the upper portion of the subjacent adsorbent. As a result, the rate of gas flow through the adsorbent can be increased.

10 Claims, 1 Drawing Sheet

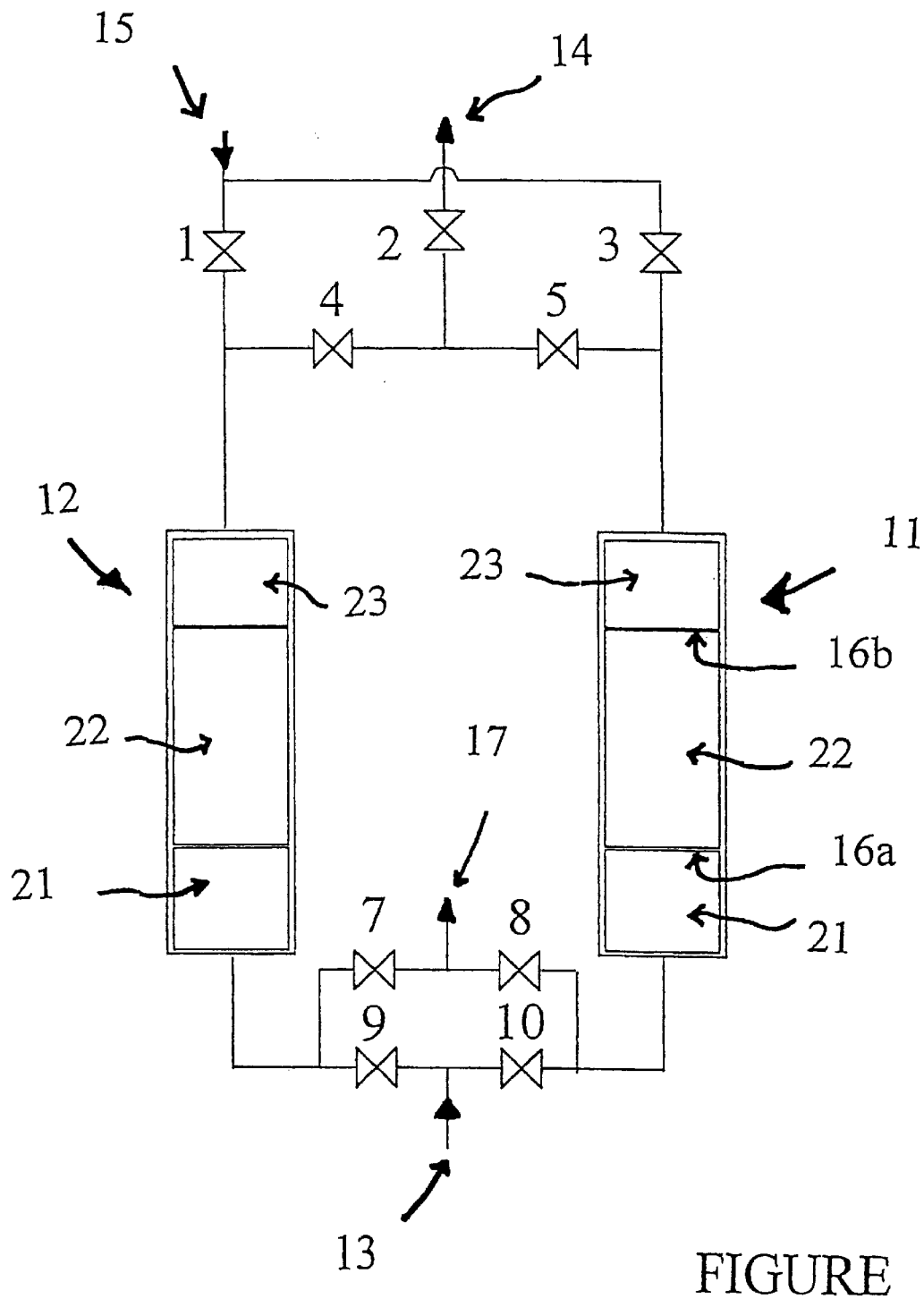
FIGURE

PROCESS AND DEVICE FOR PURIFICATION OF GAS BY ADSORPTION WITH FIXED HORIZONTAL BEDS

FIELD OF THE INVENTION

The object of the present invention is to provide a process for the pretreatment or purification of gaseous flows, in particular atmospheric air, before cryogenic separation of said air by cryogenic distillation.

BACKGROUND OF THE INVENTION

It is known that atmospheric air contains compounds which must be eliminated before the introduction of the air into heat exchangers of the cold box of an air separation unit, particularly the compounds carbon dioxide ($CO_2$), water vapor ($H_2O$) and/or hydrocarbons.

Thus, in the absence of such pretreatment of the air to eliminate these impurities of carbon dioxide and water, there takes place a condensation and a solidification of these impurities during cooling of the air to cryogenic temperatures, from which can result problems of blocking the equipment, particularly the heat exchangers, the distillation columns, etc.

Moreover, it is also customary to eliminate the hydrocarbon impurities likely to be present in air, so as to avoid a high concentration of them in the bottom of the distillation column or columns, thereby to avoid the risk of explosion.

At present, this pretreatment of the air is carried out, as the case may be, by the Temperature Swing Adsorption (TSA) process or by the Pressure Swing Adsorption (PSA) process. By the PSA process is meant PSA processes properly so-called, vacuum swing adsorption (VSA) processes, VPSA processes, and the like.

Conventionally, a TSA process cycle for the purification of air comprises the following steps:
 a) purification of the air by adsorption of the impurities at superatmospheric pressure and ambient temperature,
 b) depressurization of the adsorber to atmospheric pressure or below atmospheric pressure,
 c) regeneration of the adsorbent at atmospheric pressure, particularly with residual gases or waste gases, typically impure nitrogen from an air separation unit and reheated to a temperature conventionally between 100 and 200° C. by means of one or several heat exchanges,
 d) cooling the adsorbent to ambient temperature or below, particularly by continuing to introduce into it said residual gas from the air separation unit, but not reheated,
 e) repressurization of the adsorber with purified air from for example another adsorber operating in the production phase.

Usually, a PSA process cycle for the purification of air comprises itself substantially the same steps a), b) and e), but is distinguished from the TSA process by the absence of reheating of the residual gases or gases during the regeneration step (step c)), hence the absence of step d) and, in general, a shorter cycle time than the TSA process.

Generally speaking, the devices for pretreatment of air comprise two adsorbers, functioning in an alternate manner, which is to say that one of the adsorbers is in the production phase while the other adsorber is in the regeneration phase.

Such TSA processes for the purification of air are particularly described in U.S. Pat. No. 3,738,084 and French 7725845.

In general, the elimination of $CO_2$ and water vapor is carried out in one or several adsorbent beds, preferably several adsorbent beds, namely generally a first adsorbent adapted to separate preferentially water, for example a bed of activated alumina, of silica gel or of zeolites, and a second adsorbent bed to remove preferentially $CO_2$, for example a zeolite. There could be cited particularly U.S. Pat. Nos. 5,531,808, 5,587,003 and 4,233,038.

To obtain effective elimination of $CO_2$ and water vapor contained in the air in a same and single adsorbent bed is not an easy thing, because the water has an affinity for the adsorbents substantially greater than that of the $CO_2$. In other words, the selectivity of the adsorbents is more favorable to water than to $CO_2$.

Moreover, to be able to regenerate an adsorbent saturated with water, it is usual to bring this adsorbent to a regeneration temperature greater than 100° C.

However, very few adsorbents used at present on an industrial scale in TSA units have a physico-chemical structure suitable to resist for a long time such hydrothermal treatment; the alumina type materials are of this type.

There could be cited U.S. Pat. No. 5,232,474, which discloses the use of activated alumina to dry and decarbonize the air by a PSA process.

Conventionally, this adsorbent bed or these adsorbent beds are inserted in an adsorber or adsorbers, also called "bottles".

There exist at present several different geometries for these adsorbers.

In the conventional adsorbers, the beds of the adsorbent are placed horizontally and are stacked one above the other, which is to say that they are superposed, and are separated or not by a separation region or by an "empty" space or a space free from adsorbent material. This arrangement of superposed beds is simple and trouble-free.

On the other hand, the two ends of these adsorbers, which is to say their bottom and their top, have a diameter limited by the technological limits of metalworking and the size to be transported.

Moreover, this type of arrangement does not permit treating high flow rates of gas, for example flow rates of at least 100,000 $Nm^3$ per hour, because the speed of the gas becomes too high, which gives rise to large pressure drops and an unacceptable and harmful fluidization of the adsorbent bed or beds.

So as to overcome these problems, new adsorbers have been developed, which are designed to treat high flow rates of gas, namely adsorbers with concentric beds, so-called "layered" adsorbers or so-called "superposed" adsorbers. These types of adsorbers are particularly described in EP-A-0 714 689, U.S. Pat. No. 5,447,558, DE-A-39 19 750, FR-A-2541588 and U.S. Pat. No. 4,627,856.

However, given their more complicated technology, these adsorbers require greater investment, which is not always acceptable from an industrial standpoint.

So as to attempt to decrease the costs of the purification processes, researches have been carried out aiming to improve the properties of the adsorbents used, in particular their adsorption capacity.

In this connection can be cited the documents U.S. Pat. Nos. 3,885,927, 4,493,715, EP-A-0 766 991, U.S. Pat. No. 5,587,003, EP-A-0 733 393, U.S. Pat. No. 5,531,808 and EP-A-0 718 024, which propose different types of adsorbents having improved adsorbing capabilities for $CO_2$, which permits increasing the specific air flow rate treated for a given quantity of adsorbent and hence to decrease, on the one hand, the quantities of adsorbent used, and, on the other hand, the overall costs of the process.

However, the problem of fluidization of the adsorbent bed or beds contained in an adsorber with superposed beds has only been partially solved until now.

Thus, this problem of fluidization can be decreased by increasing the granulometry of the particles of adsorbent.

However, this solution cannot be considered as completely satisfactory because it is opposed to the present tendency, which is to decrease the purification cycle time so as to limit the quantity of adsorbent to be used.

Moreover, the adsorbents must work more and more dynamically, which is to say in the front zone. But a higher granulometry of the particles of adsorbent militates against this adsorbent dynamic, which is not acceptable.

Moreover, the technique of reverse flow cannot be considered either as satisfactory, to the extent to which oil condensates from the gas and water compression are not removed and hence the adsorbent bed is quickly degraded.

SUMMARY OF THE INVENTION

The object of the present invention is therefore to provide a process for purification, using one or several adsorbents capable of taking out water, carbon dioxide and/or hydrocarbons that may be found in atmospheric air, so as to recover purified air, substantially free from these impurities, which air can be subsequently sent to an air separation unit, such as a cryogenic unit having none of the drawbacks of known processes.

To do this, the present invention provides increasing the speed limit for fluidization of the adsorbent bed or beds contained in an adsorber, without necessarily varying the granulometry and/or the adsorption capacity of the adsorbent or adsorbents used.

The inventors of the present invention have discovered that this can be carried out by using an isostatic pressure, which is to say a mechanical pressure, on the adsorbent bed or beds. This isostatic pressure must nevertheless be able to follow the movements, such as the packing, of the adsorbent bed or beds, permitting free passage of the gas flow to be purified and must be applicable preferably over the whole surface of the adsorbent bed.

The present invention thus relates to a process for the purification of a gas flow containing at least one impurity of carbon dioxide, water vapor and/or hydrocarbons, in which at least one of the impurities is adsorbed on at least one first adsorbent bed comprising at least one first adsorbent material, in which at least one bed of ballast comprising at least one ballast material having a density higher than the density of the first adsorbent material, is located downstream of the first adsorbent bed, the at least one ballast bed exerting a mechanical pressure on at least one portion of at least the first adsorbent bed.

In other words, the ballast bed is disposed on top of the first bed of adsorbent, which is to say above the first bed of adsorbent, so as to exert a mechanical pressure on the latter, this pressure being generated by all or a portion of the weight of the bed of ballast.

As the case may be, the process of the invention can comprise one or several of the following characteristics:

the at least one bed of ballast and the at least one first adsorbent bed are separated by a loose grill;

the ballast material is an inert or adsorbent material, preferably the ballast material is an inert alumina;

the density of the ballast material is at least twice that of the density of at least the first adsorbent material, preferably at least three times greater;

at least one second bed of adsorbent comprising at least one second adsorbent material, is arranged upstream and/or downstream of the first adsorbent bed, preferably upstream of the first adsorbent bed;

the volume mass of the second adsorbent material is greater than or equal to that of the first adsorbent material;

the heat capacity of the ballast material is less than or equal to the heat capacity of the adsorbent material, preferably less than about 0.24 Kcal/Kg° C.;

the granulometry of the particles of ballast material is greater than the granulometry of the particles of the first adsorbent material and/or of the second adsorbent material;

the second adsorbent material is an activated alumina and/or the first adsorbent material is zeolite, preferably zeolite X having an Si/Al ratio below 1.15, exchanged or not;

the gas flow to be purified is air;

the elimination of $CO_2$ and of water vapor is carried out in at least one adsorber and, preferably, in at least two adsorbers operating in an alternate fashion;

the process is either TSA or PSA;

operation is carried out at an adsorption pressure of $10^5$ to $10^7$ Pa;

the process comprises at least one step of cryogenic separation of at least one portion of the purified air, preferably a step of cryogenic distillation of the purified air;

the purification of the gas, particularly of air, is carried out at a temperature comprised between $-40°$ C. and $+80°$ C.

The invention moreover relates to a device for the purification of a gaseous flow, adapted to use the process according to the invention, comprising means for compressing gas, at least one adsorber with superposed beds, containing at least one first bed of adsorbent comprising at least one first adsorbent material and at least one bed of ballast comprising at least one ballast material, the ballast bed being located downstream and above the at least one first adsorbent bed, the at least one ballast bed exerting a mechanical pressure on at least a portion of at least the first adsorbent bed. Preferably, the device comprises at least two adsorbers each containing at least two beds of adsorbent and at least one bed of ballast, said beds of adsorbent and of ballast being separated by loose separation grills.

However, so as to be sure that the presence of the ballast material does not disturb the purification process, care is taken that the ballast material gives rise only to negligible pressure drops in comparison to those in the adsorbent bed or beds, by selecting for example a ballast material of a granulometry greater than that of the particles of adsorbents and/or by providing only a small thickness of the ballast material.

Moreover, when the process is of the TSA type, there is preferably used a ballast material having a given calorific capacity, such that the heat front during regeneration can pass through the adsorber in the time allowed for this purpose.

The invention will now be described in greater detail with the help of an example of embodiment and with the single accompanying drawing, given by way of non-limiting illustration.

BRIEF DESCRIPTION OF THE DRAWINGS

The accompanying single FIGURE of drawing is a schematic representation of an installation for the purification of gas, in this instance the purification of air, adapted to use the purification process according to the present invention.

DETAILED DESCRIPTION OF THE INVENTION

This installation comprises two adsorbers 11 and 12 or bottles, operating in an alternate manner according to production cycles of predetermined duration.

Each of these two adsorbers 11 and 12 of superposed bed type contains an upstream bed 21 of a first adsorbent, in this case balls of activated alumina, an intermediate bed of a second adsorbent 22, in this case a zeolite of type LSX, and a downstream bed 23 of ballast material, in this case balls of inert alumina, for example inert alumina sold by the ALCOA company under the trade name T162.

The upstream bed 21, intermediate bed 22 and downstream bed 23 are separated, respectively, by loose separation grills 16a and 16b, which is to say that they are not fixed to the internal walls of the adsorbers 11 and 12.

Compressed air 13 to be purified is introduced by gas conduits to the inlets of adsorbers 11 and 12, where it is subjected to purification by adsorption to separate the impurities $CO_2$, water and/or hydrocarbons which it contains, on the adsorbent particles of beds 21 and 22, before being removed by gas conduits toward the utilization site 14, such as a cryogenic distillation column, or toward a storage site.

The regeneration of the adsorbent beds 21 and 22 takes place in a conventional manner, for example by means of a hot gas, such as a residual gas from an air separation unit, brought by conduits 15; the waste gas being evacuated to the atmosphere at 17.

The regulation of the gas flows, namely of the air to be purified, the purified air, the regeneration gas and the waste gas takes place by means of valves 1–5 and 7–10, which are controlled by a control unit (not shown) in a known manner.

The weight exerted by the downstream bed 23 of ballast material on the beds 21 and 22 permits avoiding or minimizing the fluidization of said adsorbent beds 21 and 22, in particular the bed 22.

Thus, given that the bed 22 of zeolites of the type LSX has a granulometry of 1.5 to 3 mm and that the bed of activated alumina 21 has a granulometry of 2 to 5 mm, the bed 21 of activated alumina thus offers smaller pressure drops for a comparable mass volume. As a result, the limit speed for fluidization of said bed 21 of activated alumina is greater than that of the bed 22 of zeolites.

It follows that the bed 22 of zeolites is hence limiting for the maximum flow rate of air that can be purified; the latter must therefore be operated to slow and/or avoid its fluidization.

When there is used a ballast material having a mass calorific capacity identical to that of zeolite, there is thus used in the adsorber a mass of ballast material substantially equal to that of the zeolite.

Generally speaking, the dimensioning of an adsorber is such that the force exerted by the gas passing through the bed of adsorbent is approximately equal to the weight of said adsorbent bed.

It follows that with a ballast material having a weight equal to that of the adsorbent bed or beds, the resulting pressure drop must be multiplied by two.

From this, and given that the flow regime of the gas through the adsorbent bed (zeolite) is turbulent, the speed of the gas can be increased in the adsorber by a multiplying coefficient equal to the $\sqrt{2}$ and this without giving rise to the fluidization of the adsorbent bed or beds; the force exerted by the passage of the gas through the ballast bed is very small compared to that exerted by said gas through the adsorbent bed or beds.

Thus, for a bed of ballast material, such as inert alumina balls, having a volume mass of about 2100 $kg/m^3$ and for a bed of adsorbent of the zeolite type of a volume mass equal to about 700 $kg/m^3$, the thickness of the bed of ballast 23 is about one-third of the thickness of the bed of zeolites 22.

Thus, as a first approximation, the specific pressure drop of a gas such as air through a bed of granular particles is inversely proportional to the diameter of the particles. Hence, to obtain a pressure drop through the ballast bed 3 which is about 10 times less than that through the zeolite bed 22, it is necessary to select particles of ballast material of a hydraulic diameter equal to at least three times that of the particles of zeolite.

The process of the present invention is particularly advantageous when it is used in a stacked bed adsorber, for treating flow rates of gas of at least 150,000 $Nm^3/h$ (1 $Nm^3$=1 $m^3$ of gas at $10^5$ Pa and at 0° C.).

We claim:

1. In a process for the purification of a gaseous flow containing at least one impurity selected from the group consisting of carbon dioxide, water vapor and hydrocarbon, comprising adsorbing at least one of said impurities on at least one first bed of adsorbent comprising at least one first adsorbent material; the improvement wherein at least one bed of ballast comprising at least one ballast material consisting of inert alumina and having a density at least twice that of the density of said first adsorbent material is located downstream of said first adsorbent bed, said at least one ballast bed exerting mechanical pressure on at least a portion of at least said first adsorbent bed, and wherein the gas to be purified is passed upward through said at least one first bed of adsorbent and then through said at least one bed of ballast material.

2. Process according to claim 1, wherein said at least one bed of ballast and said at least one first adsorbent bed are separated by a loose grill.

3. Process according to claim 1, wherein the density of the ballast material is at least three times that of the first adsorbent material.

4. Process according to claim 1, wherein at least a second bed of adsorbent comprising at least one second adsorbent material is arranged in vertical registry with said first adsorbent bed.

5. Process according to claim 4, wherein said second adsorbent material is upstream of said first adsorbent material.

6. Process according to claim 4, wherein the heat capacity of said ballast material is below about 0.24 Kcal/Kg° C.

7. Process according to claim 4, wherein the second adsorbent material is an activated alumina and the first adsorbent material is a zeolite.

8. Process according to claim 7, wherein said zeolite is a zeolite X having an Si/Al ratio below 1.15.

9. Process according to claim 1, wherein the size of the particles of ballast material is greater than the size of the particles of said first adsorbent material.

10. Process according to claim 1, wherein the gas flow to be purified is air.

\* \* \* \* \*